United States Patent [19]

Moore et al.

[11] Patent Number: 5,712,009
[45] Date of Patent: Jan. 27, 1998

[54] COEXTRUDED MULTILAYER PLASTIC CONTAINER UTILIZING POST CONSUMER PLASTIC

[75] Inventors: Duane H. Moore, Easton, Pa.; Richard W. M. Ritter, Jr., Perrysburg, Ohio

[73] Assignee: Owens-Illinois Plastic Products Inc., Toledo, Ohio

[21] Appl. No.: 122,842

[22] Filed: Sep. 16, 1993

[51] Int. Cl.$^6$ ..................................................... C08L 23/06
[52] U.S. Cl. .................. 428/35.7; 428/36.92; 428/542.8; 428/903.3; 428/500; 215/12.1; 206/524.1; 206/524.6; 264/37; 264/38; 264/454; 525/240
[58] Field of Search ................... 428/35.7, 36.92, 428/542.8, 903.3, 500; 215/1 C, 12.1; 206/524.1, 524.6; 264/DIG. 69, 37, 38; 525/240

[56] References Cited

U.S. PATENT DOCUMENTS

| | | | |
|---|---|---|---|
| 3,261,889 | 7/1966 | Sittard | 428/35 |
| 3,280,220 | 10/1966 | Nelson | 422/35 |
| 3,795,633 | 3/1974 | Golovoy | 428/35 |
| 3,884,855 | 5/1975 | Baumann | 524/584 |
| 3,976,612 | 8/1976 | Kaji | 524/418 |
| 4,115,499 | 9/1978 | Salyer | 264/122 |
| 4,250,222 | 2/1981 | Mavel | 442/168 |
| 4,332,748 | 6/1982 | Fremont | 264/11 |
| 4,390,666 | 6/1983 | Moriguchi | 525/194 |
| 4,410,602 | 10/1983 | Komoda et al. | 428/516 |
| 4,495,334 | 1/1985 | Matsuura | 525/640 |
| 4,547,551 | 10/1985 | Bailey | 525/240 |
| 4,550,143 | 10/1985 | Tanaka | 525/240 |
| 4,567,069 | 1/1986 | Jabarin | 206/524.3 |
| 4,577,768 | 3/1986 | Go | 215/44 |
| 4,705,708 | 11/1987 | Briggs et al. | 428/35 |
| 4,737,547 | 4/1988 | White | 525/193 |
| 4,786,688 | 11/1988 | Thiersault | 525/240 |
| 4,808,482 | 2/1989 | Benge | 428/411.1 |
| 5,028,663 | 7/1991 | Chung | 525/198 |
| 5,030,662 | 7/1991 | Banerjie | 521/43.5 |
| 5,073,416 | 12/1991 | Avakian | 428/2 |
| 5,073,598 | 12/1991 | Anzini | 525/193 |
| 5,210,142 | 5/1993 | Kale et al. | 525/240 |

FOREIGN PATENT DOCUMENTS 9119763   12/1991   WIPO .

Primary Examiner—Charles Nold

[57] ABSTRACT

A coextruded multilayer plastic container utilizing post consumer plastic resin comprising an appearance enhancing thin outer layer of ethylene polymers, which enhances the appearance of the container, an intermediate layer comprising a fusion blend of post consumer resin with or without colorant and a third layer comprising a fusion blend of post consumer resin which may have mixed colors. In a modified and preferred form, a fourth inner layer of virgin ethylene polymer is provided.

26 Claims, 2 Drawing Sheets

COEXTRUDED MULTILAYER PLASTIC CONTAINER UTILIZING POST CONSUMER PLASTIC

This invention relates to coextruded plastic containers and particularly to blown plastic containers made of post consumer resin.

BACKGROUND AND SUMMARY OF THE INVENTION

In the use of plastic materials for containers such as bottles, it has been found desirable to attempt to recycle and reuse the plastic which is commonly known as post consumer plastic (PCP) or post consumer resin (PCR). In attempts to make containers from such materials, it has been found that the properties have been adversely affected.

Specifically when containers are made from recycled post consumer high density polyethylene homopolymers (HDPE) container scrap, it has been found that the containers have diminished physical properties. Such containers made of high density polyethylene homopolymers also have been used for packaging of certain types of liquid detergent products. The use of such containers to package liquid detergent products has been somewhat restricted, however, by reason of the fact that many types of liquid detergent products accelerate the tendency of the container to exhibit stress cracking. Stress cracking is evidenced by the appearance of hazy cracks in the container which are aesthetically unpleasing to the ultimate consumer. In extreme cases, stress cracking can lead to leakage of the contents from the container. Stress cracking can occur when the containers are for liquid products including liquid detergents and liquid hypochlorite bleaches.

It has been suggested that such post consumer resin be utilized because large quantities of high density polyethylene post consumer resin are available due to the extensive use of high density polyethylene in large containers for milk and water. Post consumer resin from such containers contains contaminants of paper and other plastic resins, for example, from closures such that it has been generally thought that it can not be used to make satisfactory plastic containers.

In copending application Ser. No. 07/842,839 filed Feb. 27, 1992, having a common assignee with the present application, there is disclosed a plastic container which is made from a fusion blend of a post consumer resin and ethylene polymers comprising post consumer resin of homopolymer high density polyethylene plastic and virgin high density polyethylene copolymer resin. The physical properties of the container including stress crack resistance are maintained as contrasted to the loss of such physical properties that have been heretofore resulted from the use of post consumer resins.

In accordance with the aforementioned application, pellets of a homopolymer high density polyethylene resin from post consumer resin (PCR) and pellets of a virgin high density polyethylene copolymer were mixed and fusion blended. Containers were blow molded and subjected to testing for stress cracking, top load and drop impact.

In copending application Ser. No. 07/842,838 filed Feb. 27, 1992, having a common assignee with the present application, there is disclosed a plastic container made from a fusion blend of a post consumer plastic and ethylene polymers and comprising post consumer resin of homopolymer high density polyethylene resin and a small amount of linear low density polyethylene resin. In another form, the container is made from a blend of post consumer homopolymer high density polyethylene resin, virgin high density polyethylene resin with a small amount of linear low density polyethylene resin. The physical properties of the container including stress cracks resistance are maintained as contrasted to the loss of such physical properties that have been heretofore resulted from the use of post consumer resins.

Large quantities of plastic resin are used to make containers which have an attractive appearance provided by additives which function to provide gloss or attractive colors. Such additives are quite expensive. As far as the present inventors are aware, it has not heretofore been thought to have been possible to utilize post consumer resin to make plastic containers wherein the container has additives to enhance gloss, or color, which requires expensive colorants because of the gray colors that are inherent in the post consumer resin.

Among the objectives of the present invention are to provide a plastic container which has an outer appearance layer; which not only utilizes post consumer plastic but also permits the use of post consumer resin having various colors therein; wherein plastic container is constructed and arranged such that the post consumer resin having multiple colors is obscured and results in a container that provides an attractive appearance; wherein a relatively dark, thick, post consumer resin layer comprises the major portion of the container is not visible; wherein the container can have a significant attractive appearance color; and wherein the container results in significant resin savings.

In accordance with the invention, a coextruded multilayer plastic container utilizing post consumer plastic resin comprising an appearance enhancing thin outer layer comprising a fusion blend of ethylene polymers and a colorant which enhances the appearance of the container, an intermediate layer comprising a fusion blend post consumer recycled resin with or without colorant and a third layer comprising post consumer resin which may have mixed colors. In a modified and preferred form, a fourth inner layer of virgin ethylene polymer is provided over the third inner layer.

DESCRIPTION

Figure 1:
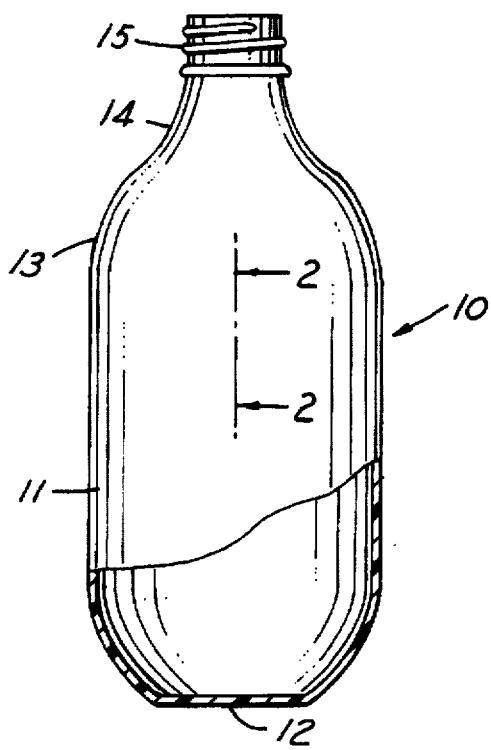
FIG. 1 shows a plastic container embodying the invention.

Referring to FIG. 1, a multilayer hollow plastic container 10 embodying the invention is preferably made by coextruding a multilayer parison and then blow molding the container hving a body portion 11, a base portion 12, a shoulder portion 13 and a neck portion 14 having a finish 15.

Figure 2:
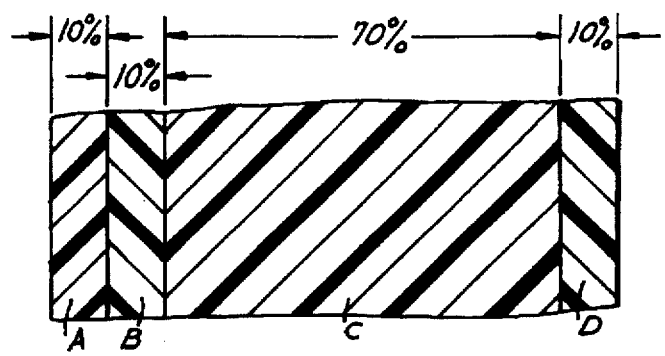
FIG. 2 is a fragmentary sectional view on a greatly enlarged scale taken along the line 2—2 in FIG. 1 diagrammatically showing the cross section of the container.

Referring to FIG. 2, in a preferred form, the container 10 comprises four layers; an outer thin appearance enhancing plastic layer A comprising a fusion blend of ethylene homopolymer polymers and an additive for enhancing the appearance; an adjacent thin plastic layer B which functions to mask the color of a third thicker plastic layer C one which comprises a fusion blend of post consumer resin which may have mixed colors. A fourth thin inner plastic layer D of virgin ethylene homopolymer is provided on the interior of the container which protects the contents of the container where needed.

Figure 3:
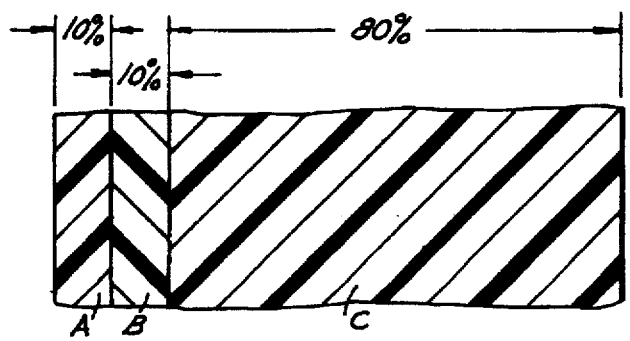
FIG. 3 is a fragmentary sectional view on a greatly enlarged scale diagrammatically showing the cross section of a modified form of container.

In the form shown in FIG. 3, the inner layer D is omitted.

The plastic resin of the outer layer A may comprise a fusion blend of ethylene copolymers such as linear low density polyethylene, low density polyethylene, high density polyethylene, or mixtures thereof and an appearance enhancing additive.

Typical additives for enhancing comprise pigments providing bright attractive colors; flakes for providing pearlescent effects, such as aluminum or calcium carbonate flakes; and fluorescent dyes or pigments which absorb light at one wave length and emit light of greater wave length as is well known; and polymers of selected molecular weights which provide a high gloss appearance.

The thin plastic layer B may comprise a fusion blend of ethylene polymer, preferably virgin high density polyethylene or post consumer resin and an appearance enhancing additive which will mask the post consumer resin in the thick layer C.

Post consumer resin contains primarily the plastic from high density polyethylene homopolymer containers used for packaging milk and colored plastic containers and possible polypropylene resin from syrup bottles, multi-layer ketchup bottles and caps. Such post consumer resin may have the properties set forth in the following Table I.

TABLE I

| PROPERTY | SPECIFIED VALUE |
|---|---|
| Material Density | .960 ± .02 natural |
| Melt Flow - Melt Index | 0.5 ± 0.3 dgm |
| Fines | <0.01% |
| Moisture | <0.05% |
| Contamination | |
| Paper | <0.01% |
| Plastic-Dens. | >1.0 gm/cc < 0.1% |

The thin inner layer D, when used, comprises ethylene copolymers such as virgin high density polyethylene or linear low density polyethylene.

In each form the major portion of the thickness of the wall of the container is in thick layer C of post consumer resin.

The linear low-density ethylene polymer(s) of the invention have a density in a range of about 0.91 to about 0.93 gm/ml, preferably in a range of about 0.92 to about 0.93 gm/ml, and especially about 0.925 gm/ml. The linear, low-density ethylene polymers will have a melt index of less than about 2.0 and preferably less than about 1.0 gm/10 min. It is desirable for the melt index to be close to the melt index of the linear high-density ethylene polymer included in the blend. These polymers are ethylene copolymers having polymerized about 2–6 and preferably about 4–6 mol % of an alpha-monoolefin containing 3 to 12 carbon atoms with the balance of the monomer polymerized therein being ethylene. The linear low-density ethylene polymers employed in the present invention have long linear chains with controlled numbers of relatively short chain branches attached to the linear chain along its entire length.

The low density polyethylene homopolymer comprises utilized in the outer layer has a melt index of at least 2 and preferably less than 1; and a density of not greater than 0.93 g/ml.

The low density polyethylene comprises the outside high gloss layer. The low density polyethylene has melt index of at least 2 and preferably less than 1 and will have a density mzx of 0.93 g/ml.

The virgin high density copolymer resin contains linear high-density ethylene polymer. The linear high-density ethylene copolymer included in the blends will have a density of at least about 0.94 gm/ml, a melt index of less than about 0.5 gm/10 min. and will have polymerized therein at least about 98 mol % ethylene with any comonomer polymerized therein being an alpha-monoolefin containing about 3 to 12 carbon atoms. Such linear high-density ethylene polymers are known and reported in the art and are commercially available from numerous commercial producers. Such linear high-density ethylene polymers are prepared by polymerizing ethylene, optionally in the presence of an alpha-monoolefin comonomer containing 4 to 12 carbon atoms in the presence of certain metallic catalysts such as chromium catalysts, e.g. $CrO_3$ supported on silica-alumina supports, and the Ziegler-Natta catalysts, e.g. $TiCl_3$ employed in conjunction with certain aluminum alkyl cocatalysts. The requisite density and melt index desired in the polymer are obtained by proper control of polymerization conditions including temperature, pressure, comonomer concentration, and the concentration of telegenating agents such as hydrogen. The preferred linear high-density ethylene polymers will have a density of at least about 0.94 gm/ml. The especially preferred polymers will have a density of at least about 0.95 gm/ml. Stress crack resistance is conventionally conducted with test methods as established by Technical Bulletin PBI 11-1978 of the Plastic Bottle Institute, Rev.1-1991 or ASTM D2561-70 (Reapproved 1989).

Typical examples of thicknesses of side walls of a container embodying the invention are:

| | | |
|---|---|---|
| Four layer | thin layer A | 2–20 mils |
| | thin layer B | 2–10 mils |
| | thick layer C | 5–30 mils |
| | thin layer D | 1–10 mils |
| Three layer | thin layer A | 2–20 mils |
| | thin layer B | 2–10 mils |
| | thick layer c | 5–30 mils |
| Three layer | thin layer A | 3–20 mils |
| | thick layer B | 8–30 mils |
| | thin layer C | 1–10 mils |

Examples of specific compositions of the layers in containers are as follows:

EXAMPLE I

Thin layer A—glossy high density polyethylene and pearlescent additive

Thin layer B—post consumer resin (milk) and $TiO_2$ colorant

Thick layer C—post consumer resin (mixed color) and regrind

Thin layer D—virgin high density polyethylene and colorant

EXAMPLE II

Thin layer A—glossy high density polyethylene

Thin layer B—post consumer resin (milk) and $TiO_2$ colorant

Thick layer C—post consumer resin (mixed color) and regrind

Thin layer D—virgin high density polyethylene and colorant

EXAMPLE III

Thin layer A—glossy low density polyethylene
Thin layer B—post consumer resin (milk) and $T_1O_2$ colorant
Thick layer C—post consumer resin (mixed color) and regrind
Thin layer D—virgin high density polyethylene
Metal fragments None
Other (glass, stone) None

EXAMPLE IV

Figure 4:
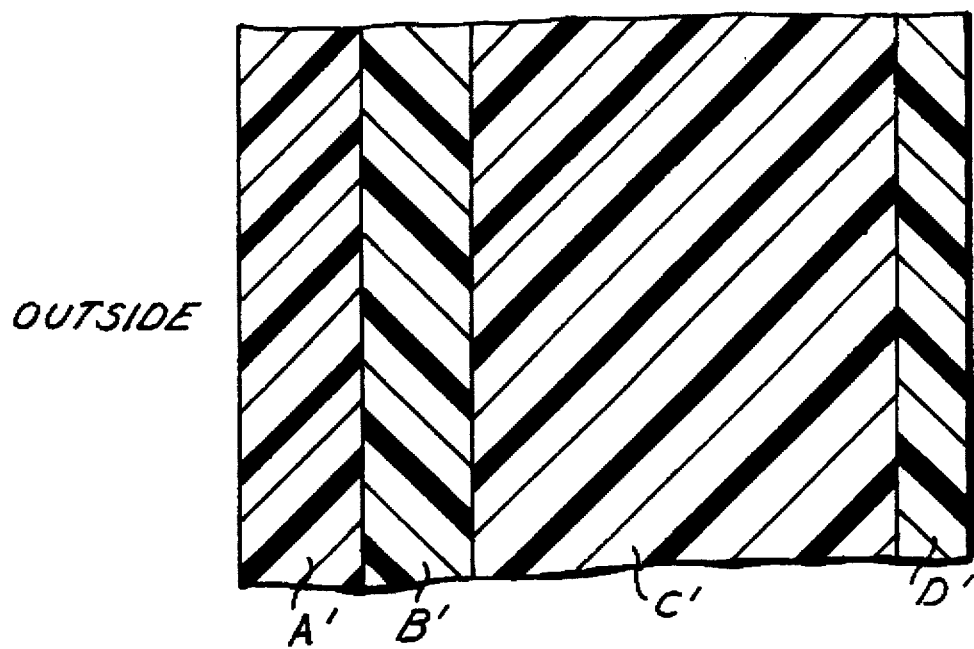
FIG. 4 is a fragemetmary sectional view on a greatly enlarged scale diagrammatically showing the cross section of another modified form of container.

Thin layer A—virgin high density polyethylene, glossy high density polyethylene and linear low density polyethylene
Thin layer B—post consumer resin (milk) $T_1O_2$ colorant
Thick layer C—adhesive layer
—Post consumer resin and regrind
Thin layer D—Nylon In the form shown in FIG. 4, the inner player layer D' is made of a solvent resistant material, such as nylon, to provide a construction whereby the container can be used for solvent products such as petroleum distillates.

In this form, the third layer C' comprises post consumer recycled polyethylene resin, process trim and offware scrap. An adhesive layer (not shown) is provided between the layer B and layer C' and also between layer C' and layer D' for layer adhesion. This adhesive layer comprises a nylon/polyethylene adhesive.

As shown in the drawings, the layer C, C' comprises the major portion of the thickness.

It can thus be seen that there has been provided a coextruded multi-layer plastic container utilizing post consumer plastic resin comprising an appearance enhancing thin outer layer comprising a fusion blend of ethylene polymers and a colorant which enhances the appearance of the container, an intermediate layer comprising a fusion blend post consumer recycled resin with or without colorant and a third layer comprising post consumer resin which may have mixed colors. In a modified and preferred form, a fourth inner layer of virgin ethylene polymer is provided over the third inner layer.

It can thus be seen that there has been provided a plastic container which has an outer appearance layer; which not only utilizes post consumer plastic but also permits the use of post consumer resin having various colors therein; wherein plastic container is constructed and arranged such that the post consumer resin having multiple colors is obscured and results in a container that provides an attractive appearance; wherein a relatively dark, thick, post consumer resin layer comprises the major portion of the container is not visible; wherein the container can have a significant attractive appearance color; and wherein the container results in significant resin savings.

We claim:

1. A multilayer coextruded and blow molded hollow plastic container which has a side wall consisting essentially of
    a thin outer plastic layer comprising a fusion blend of virgin plastic resin and an appearance enhancing additive,
    said appearance enhancing additive being selected from the group consisting of pigments providing bright attractive colors, flakes for providing pearlescent effects, fluorescent dyes of pigments which absorb light of one wave length and polymers of selected molecular weights which provide a high gloss appearance, or mixtures thereof,
    a thin intermediate opaque plastic layer comprising a fusion blend of post consumer resin with colorants heat bonded to the outer layer during coextrusion without adhesives,
    a relatively thick inner plastic layer having a thickness greater than the thickness of the outer plastic layer and the intermediate opaque plastic layer comprising post consumer resin heat bonded to the intermediate layer during coextrusion without adhesives,
    said post consumer resin comprising the major portion by weight of the container, and
    said thin intermediate plastic layer masking the post consumer resin in said relatively thick inner plastic layer.

2. The plastic container set forth in claim 1 wherein said thin outer plastic layer comprises ethylene polymers selected from the group consisting of linear low density polyethylene, low density polyethylene, high density polyethylene, or mixtures thereof.

3. The plastic container set forth in claim 2 whereto said thin intermediate plastic layer comprises a fusion blend of post consumer resin primarily the plastic from high density polyethylene homopolymer containers used for packaging milk and colorant.

4. The plastic container set forth in claim 3 wherein said thick inner plastic layer comprises a fusion blend of post consumer resin including post consumer resin from colored plastic containers and regrind.

5. The plastic container set forth in claim 1 wherein said thin intermediate plastic layer comprises a fusion blend of post consumer resin primarily the plastic from high density polyethylene homopolymer containers used for packaging milk and colorant.

6. The plastic container set forth in claim 5 wherein said thick inner plastic layer comprises said post consumer resin including post consumer resin from colored plastic containers and regrind.

7. The plastic container set forth in any one of claims 2, 3–6 including a coextruded thin layer of plastic resin overlying said inner layer.

8. The plastic container set forth in claim 7 wherein said coextruded thin layer overlying said inner layer comprises virgin high density copolymer resin overlying the inner layer and heat bonded to the inner layer during coextrusion without adhesives.

9. The container set forth in claim 7 wherein said coextruded thin inner layer overlying said inner layer comprises solvent resistant plastic resin overlying the inner layer and bonded thereto by a coextruded layer.

10. The container set forth in claim 9 wherein said solvent resistant plastic resin comprises nylon including a coextruded adhesive layer between the intermediate opaque layer and the inner layer of post consumer resin and a coextruded adhesive layer between the inner layer of post consumer resin and said further inner layer of solvent resistant plastic, each said adhesive layer comprising a nylon/polyethylene adhesive.

11. The plastic container set forth in claim 7 wherein said thin layer overlying said thin layer comprises virgin high density polyethylene.

12. The container set forth in claim 1 wherein said plastic layers have thicknesses ranging as follows:

| thin outer layer | 2–20 mils |
|---|---|
| thin intermediate layer | 2–10 mils |
| thick layer | 5–30 mils. |

13. The container set forth in claim 7 wherein said layers have thicknesses ranging as follows:

| thin outer layer | 2–20 mils |
|---|---|
| thin intermediate layer | 2–10 mils |
| thick layer | 5–30 mils |
| thin inner layer | 1–10 mils. |

14. A method of forming a multilayer coextruded plastic container comprising
coextruding a multilayer parison consisting essentially a thin outer plastic layer comprising a fusion blend of virgin plastic resin and an appearance enhancing additive, a thin intermediate opaque plastic layer comprising a fusion blend of a post consumer resin with colorants heat bonded to the outer layer during coextrusion without adhesives, and a relatively thick inner layer having a thickness greater than the thickness of the outer plastic layer and the intermediate opaque plastic layer comprising post consumer resin heat bonded to the intermediate layer during coextrusion without adhesives, said intermediate layer masking the post consumer resin,
said appearance enhancing additive being selected from the group consisting of pigments providing bright attractive colors, flakes for providing pearlescent effects, fluorescent dyes of pigments which absorb light of one wave length and polymers of selected molecular weights which provide a high gloss appearance, or mixtures thereof,
said post consumer resin comprising the major portion by weight of the container, and
blow molding the multilayer parison to form a multilayer container wherein the thin intermediate plastic layer masks the post consumer resin in said relatively thick inner plastic layer.

15. The method set forth in claim 14 wherein said thin outer plastic layer comprises ethylene polymers selected from the group consisting of linear low density polyethylene, low density polyethylene, high density polyethylene, or mixtures thereof.

16. The method set forth in claim 15 wherein said intermediate plastic layer comprises a fusion blend of post consumer resin primarily from high density polyethylene homopolymer containers used for packaging milk and colorant.

17. The method set forth in claim 16 wherein said thick inner plastic layer comprises said post consumer resin including post consumer resin from colored plastic containers and regrind.

18. The method set forth in claim 15 wherein said intermediate plastic layer comprises a fusion blend of post consumer resin primarily from high density polyethylene homopolymer containers used for packaging milk and colorant.

19. The method set forth in claim 18 wherein said thick inner plastic layer comprises consumer resin including post consumer resin from colored plastic containers and regrind.

20. The method set forth in any one of claim 16, 16–19 including coextruding a thin layer of plastic resin overlying said inner layer.

21. The method set forth in claim 20 wherein said coextruded thin layer overlying said inner layer comprises virgin high density copolymer resin overlying the inner layer and heat bonded to the inner layer during coextrusion without adhesives.

22. The method set forth in claim 20 wherein said coextruded thin inner layer comprises solvent resistant plastic resin overlying the inner layer and bonded thereto by a coextruded layer.

23. The method set forth in claim 22 wherein said solvent resistant plastic resin comprises nylon including coextruding an adhesive layer between the intermediate opaque layer and the inner layer of post consumer resin and coextruding an adhesive layer between the inner layer of post consumer resin and said further inner layer of solvent resistant plastic, each said adhesive layer comprising a nylon/polyethylene adhesive.

24. The method set forth in claim 20 wherein said thin layer comprises virgin high density polyethylene.

25. The method set forth in claim 14 wherein said layers have thicknesses ranging as follows:

| thin outer layer | 2–20 mils |
|---|---|
| thin intermediate layer | 2–10 mils |
| thick layer | 5–30 mils. |

26. The method set forth in claim 20 wherein said layers have thicknesses ranging as follows:

| thin outer layer | 2–20 mils |
|---|---|
| thin intermediate layer | 2–10 mils |
| thick layer | 5–30 mils |
| thin inner layer | 1–10 mils. |

* * * * *